(12) United States Patent
Koberstein (10) Patent No.: US 9,187,128 B2
(45) Date of Patent: Nov. 17, 2015

(54) HYBRID VEHICLE AND CONVERSION KIT

(71) Applicant: John K. Koberstein, Albany, OR (US)

(72) Inventor: John K. Koberstein, Albany, OR (US)

( * ) Notice: Subject to any disclaimer, the term of this patent is extended or adjusted under 35 U.S.C. 154(b) by 83 days.

(21) Appl. No.: 13/975,118

(22) Filed: Aug. 23, 2013

(65) Prior Publication Data

US 2014/0167399 A1    Jun. 19, 2014

Related U.S. Application Data

(60) Provisional application No. 61/692,440, filed on Aug. 23, 2012.

(51) Int. Cl.
*B60R 21/13* (2006.01)
*B62D 21/00* (2006.01)
*B62D 21/17* (2006.01)
*B62K 5/01* (2013.01)
*B62K 13/00* (2006.01)
*B62D 21/18* (2006.01)
*B62D 23/00* (2006.01)

(52) U.S. Cl.
CPC . *B62D 21/17* (2013.01); *B62K 5/01* (2013.01); *B62K 13/00* (2013.01); *B62D 21/183* (2013.01); *B62D 23/005* (2013.01)

(58) Field of Classification Search
CPC .................. B62D 21/183; B60Y 2200/124
USPC ............... 180/209, 311, 312, 908; 280/288.1, 280/80.1, 781, 124.109, 124.134, 124.135, 280/149.1, 756; 296/193.04, 193.07, 296/193.12, 203.01, 204
See application file for complete search history.

(56) References Cited

U.S. PATENT DOCUMENTS

| | | | | | |
|---|---|---|---|---|---|
| 3,656,571 | A | * | 4/1972 | Canfield | 180/11 |
| 4,629,023 | A | * | 12/1986 | Carpanelli et al. | 180/357 |
| 4,650,210 | A | * | 3/1987 | Hirose et al. | 280/798 |
| 4,706,769 | A | * | 11/1987 | Latourelle et al. | 180/9.21 |
| 4,773,675 | A | * | 9/1988 | Kosuge | 280/781 |
| 4,798,399 | A | * | 1/1989 | Cameron | 280/756 |
| 4,799,565 | A | * | 1/1989 | Handa et al. | 180/69.4 |
| 4,799,708 | A | * | 1/1989 | Handa et al. | 280/796 |
| 4,950,017 | A | * | 8/1990 | Norton | 296/77.1 |
| 5,054,842 | A | * | 10/1991 | Ishiwatari et al. | 296/191 |
| 5,061,007 | A | * | 10/1991 | Simpson | 296/180.5 |
| 5,251,713 | A | * | 10/1993 | Enokimoto | 180/68.4 |
| 5,564,517 | A | * | 10/1996 | Levasseur | 180/185 |
| 5,607,210 | A | * | 3/1997 | Brazier | 305/131 |
| 6,095,275 | A | * | 8/2000 | Shaw | 180/185 |
| 6,267,388 | B1 | * | 7/2001 | Atkinson | 280/6.157 |

(Continued)

*Primary Examiner* — Ruth Ilan
*Assistant Examiner* — Laura Freedman
(74) *Attorney, Agent, or Firm* — Dean A Craine (57) ABSTRACT

A conversion kit for converting an ATV into a low profile, vehicle with a driver cage and roll bar. The conversion kit includes a sub-frame assembly made of lightweight tubular material. During assembly, the ATV's front suspension, handlebars, front wheels, front shocks, and hand and foot controls are disconnected from the ATV. The sub-frame assembly is longitudinally aligned and connected to the A-Arm mounting brackets on the ATV's main frame assembly. The sub-frame assembly includes a protective cage frame and a roll bar. The ATV's front suspension and A-arms are re-connected to A-arm mounting brackets attached to the front section of the sub-frame assembly. The sub-frame assembly includes foots pedals and receives the ATV's handlebars with the hand controls. The kit includes a cable and wire harness sets and a seat belt assembly. It may also include an optional seat, mirrors, wheel extension adaptors, a foot shield and a rear wing.

15 Claims, 12 Drawing Sheets

(56) References Cited

U.S. PATENT DOCUMENTS

| | | | |
|---|---|---|---|
| 6,431,301 B1* | 8/2002 | Forbes | 180/185 |
| 6,615,939 B1* | 9/2003 | Karales et al. | 180/9.26 |
| 6,786,290 B2* | 9/2004 | Kuji et al. | 180/68.1 |
| 6,871,434 B2* | 3/2005 | Sunaga et al. | 40/593 |
| 7,063,342 B2* | 6/2006 | Seki | 280/124.134 |
| 7,182,169 B2* | 2/2007 | Suzuki | 180/426 |
| 7,338,112 B2* | 3/2008 | Gilliland et al. | 296/190.03 |
| 7,380,805 B1* | 6/2008 | Turner | 280/124.135 |
| 7,445,075 B2* | 11/2008 | Ozawa et al. | 180/291 |
| 7,461,851 B2* | 12/2008 | Yamamura et al. | 280/124.135 |
| 7,510,199 B2* | 3/2009 | Nash et al. | 280/124.135 |
| 7,537,499 B2* | 5/2009 | Davis et al. | 440/12.5 |
| 7,650,959 B2* | 1/2010 | Kato et al. | 180/312 |
| 7,658,258 B2* | 2/2010 | Denney | 180/311 |
| 7,677,343 B2* | 3/2010 | Kitai et al. | 180/89.17 |
| 7,690,661 B2* | 4/2010 | Tsuruta et al. | 280/124.135 |
| 7,891,455 B2* | 2/2011 | Feutz | 180/210 |
| 8,087,694 B2* | 1/2012 | Johnson et al. | 280/756 |
| 2004/0129483 A1* | 7/2004 | Girouard et al. | 180/311 |
| 2005/0103554 A1* | 5/2005 | Meglioli | 180/333 |
| 2005/0173180 A1* | 8/2005 | Hypes et al. | 180/292 |
| 2013/0267377 A1* | 10/2013 | Jenkins, Jr. | 477/3 |
| 2014/0035259 A1* | 2/2014 | Koren et al. | 280/638 |

* cited by examiner

HYBRID VEHICLE AND CONVERSION KIT

This utility patent application is based upon and claims the filing date benefit of U.S. provisional patent application (Application No. 61/692,440) filed on Aug. 23, 2012.

COPYRIGHT NOTICE

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

The present invention generally relates to kits that enable one type of vehicle into another vehicle and more particularly, to kits used to easily convert an ATV into a low profile, car-like vehicle, and then allows the car-like vehicle to easily reconfigured into an ATV.

2. Description of the Related Art

Four wheel all-terrain vehicle (referred to hereinafter as an 'ATV') are vehicles used in rugged terrain, such as dirt back roads and trails. Because drivers sit upright, the center of gravity of the ATV and rider is relatively high similar to a motorcycle. Because ATV's are driven at high speeds and over rough terrain and obstacles, they often spill or rollover injuring the driver. Possessing adequate strength, learning how to lean into corners, and how to simultaneously steer, control the throttle, the brakes and gears are all important skills that must be perfected to prevent spills or rollovers. Unfortunately, young or inexperienced drivers do not have these skills and therefore, are more likely to spill or rollover. A lower profile car-like vehicle that has the same handlebars, throttle control, brakes, gears, engine, transmission and throttle and brakes components used on an ATV that includes a roll cage that young or inexperienced drivers may use to master the driving skills used with an ATV, would be highly desirable.

Many ATV owners enjoy riding their ATV's not only on back roads and on trails but also on sand dunes and beaches. Because beaches have less obstacles, drivers often drive at higher speeds. Unfortunately, sand on a beach is much softer than a trail, which cause spills or rollover. Many ATV owners forgo riding their ATV's on sand dunes or on beaches. Some ATV owners elect to purchase a separate vehicle specially made for use on sand, such as a dune buggy. The purchase of two separate vehicles is expensive and prohibited for some users.

What is needed is a conversion kit that allows an owner of an ATV to easily convert the ATV into a low profile car-like vehicle similar to a dune buggy that uses the ATV's handlebars, main body, engine, transmission, wheels, and throttle, gear, and brake controls and can also be easily converted from the low profile car-like vehicle back to the ATV.

It is an object of the present invention provides a conversion kit that permits conversion of an ATV into a lightweight, low profile four wheel dune buggy. It is also an object of the present invention to provide a conversion kit that uses the ATV's front suspension, main body, engine, transmission, handlebars, foot controls and hand controls so young drivers become familiar with then learn how to safely operate the vehicle. It is another object of the present invention to protect the driver in a protective cage and roll bar.

SUMMARY OF THE INVENTION

The purpose of the present invention is the conversion of an ATV to lightweight, low profile, all terrain car-like vehicle that repositions the driver in a sitting position inside a protective cage and adjacent to a rigid roll bar. The car-like vehicle is assembled using parts from the kits and substantially all of the components used on the an ATV so the driver must use the same driving skills used with an ATV.

The conversion kit includes a sub-frame assembly designed to connect to the front section of a main frame used on an ATV. Prior to assembly, the ATV's front suspension, front axles, front wheels hubs, steering column, handlebar and foot pedals are removed from the main frame. The distal ends of all electrical wires and control cable are also disconnected. Once all of these components have been disconnected, the vehicle frame is then assembled.

The sub-frame assembly is made of lightweight tubular material longer and wider than the ATV's main frame. During assembly, the sub-frame assembly is longitudinally aligned in front of the main frame. The sub-frame assembly includes two pairs of cross members that extend inward from the sub-frame assembly's side members and connect to the two A-arm mounting brackets on the two sides of the main frame on the ATV. When attached, the ATV's main frame and the sub-frame assembly form an elongated rigid vehicle frame.

The front section of the sub-frame assembly is configured extend around and upward and form a protective cage in which the driver sits. The front section of the sub-frame assembly includes an upper steering mount plate that receives the carrier bearing mounting plate commonly used with ATVs. The front section of the sub-frame assembly also includes a lower steering column mount configured to receive the lower end of the steering column. The two front A-arms from the ATV are attached to two A-arm brackets on the opposite sides of the sub-frame assembly. Front suspensions and front wheel hubs are then attached to the A-arms. Tie rods from each front wheel assembly is attached to the steering column. The ATV's handlebar is then attached to the steering column.

Located inside the cage and attached to the sub-frame assembly are optional foot pedals.

The kit also includes a seat belt assembly, a multiple cable extension set, an electrical wire harness set, and an optional seat, front foot shield, mirrors and rear wing. The multiple cable extension set includes cables that connect the throttle control, front brake hand control, the clutch pedal and rear brake pedal to the ATV's matching components. The wire harness set includes extension wires and plug connectors that enable the extension wires to connect a universal harness or directly to the ATV's electrical wires the control the starter, the kill switch, and lights.

Because the sub-frame assembly is wider than the ATV's main frame, the front wheels when attached to the sub frame assembly are further apart than the rear wheels. Included with the kit is a pair of rear wheel hub extending adapters that connect to the rear axles and reposition the vehicle's rear wheel outward and further apart to match the spacing of the front wheels.

Because the engine on an ATV is air cooled, the sub-frame assembly is made of lightweight tubing, openings are formed on the front, sides, top and bottom that allow air to flow freely into the engine. Attached to the front of the sub-frame assembly are adjustable shock suspension mounts and an optional aerodynamic front shield that protects the driver's forward extending feet when driving. The sub-frame assembly also includes two optional, longitudinally and diagonally aligned rear wing support members that connect to a rear wing that produces a downward force on the ATV' rear wheels when driven at high speeds.

DETAILED DESCRIPTION OF THE PREFERRED EMBODIMENT(S)

Figure 1:
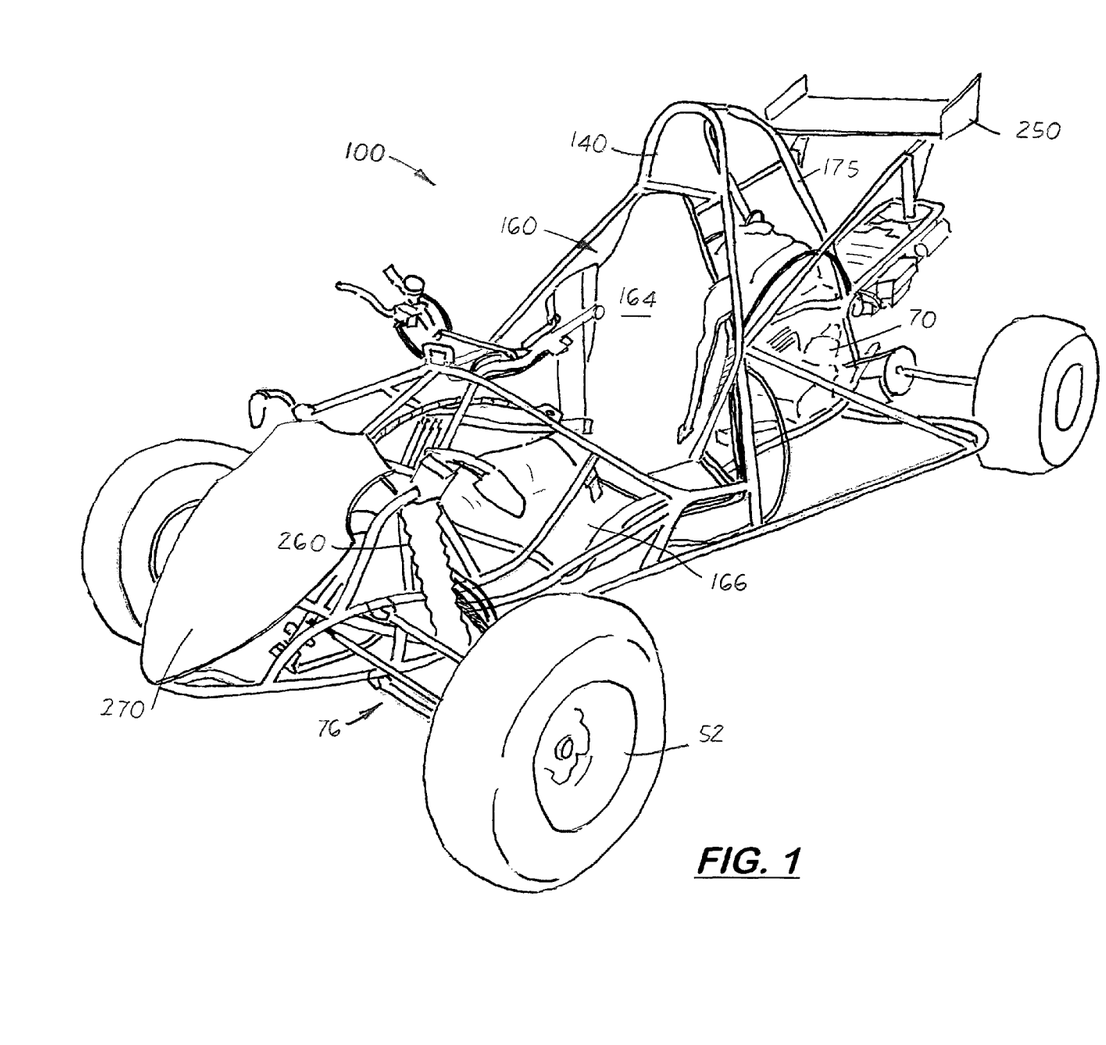
FIG. 1 is a front perspective view of the hybrid vehicle using conversion kit and the main body, engine and rear suspension system and the front wheels from an ATV.
Figure 2:
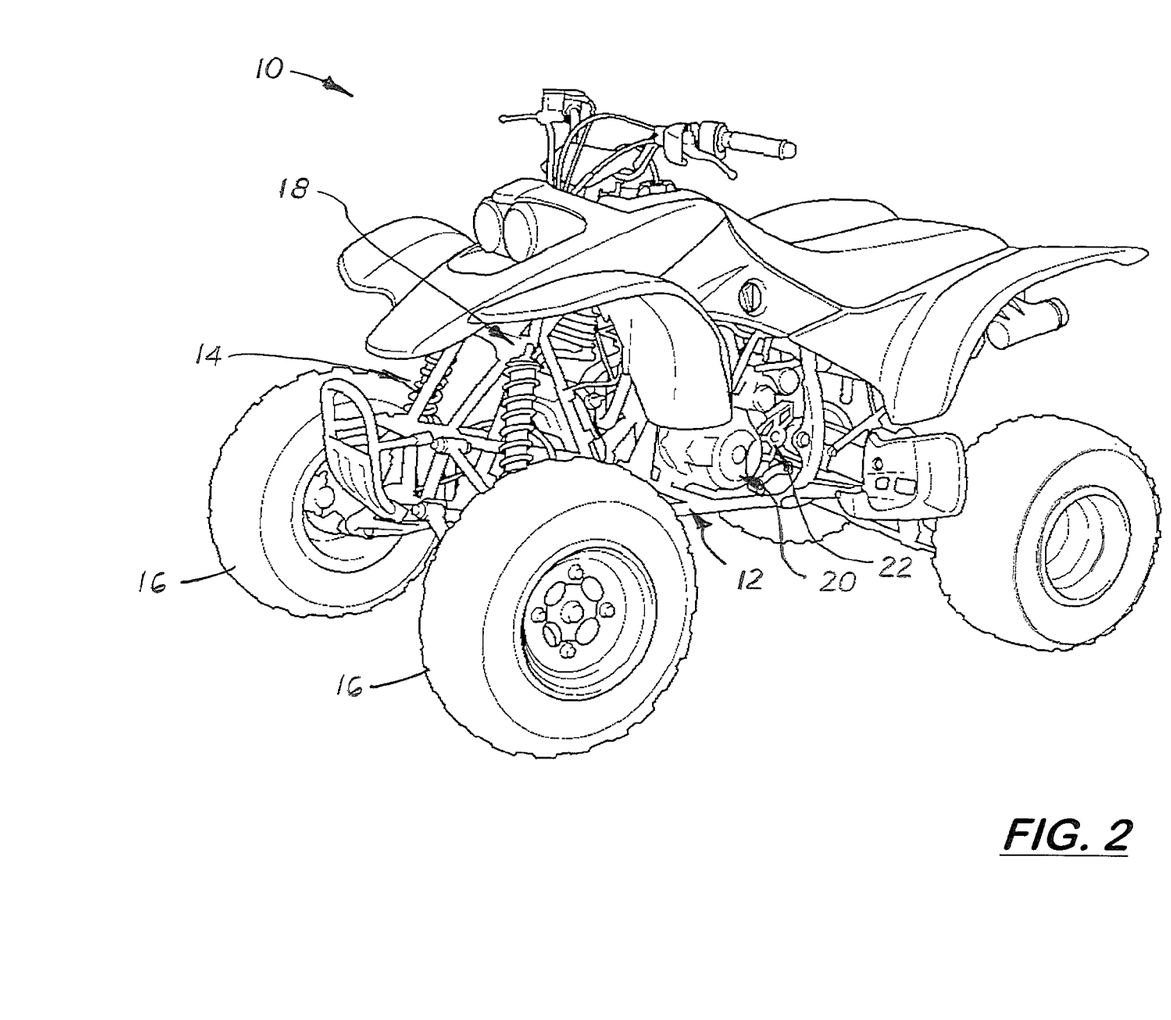
FIG. 2 is a front perspective view of an ATV converted into the hybrid vehicle shown in FIG. 1.
Figure 4:
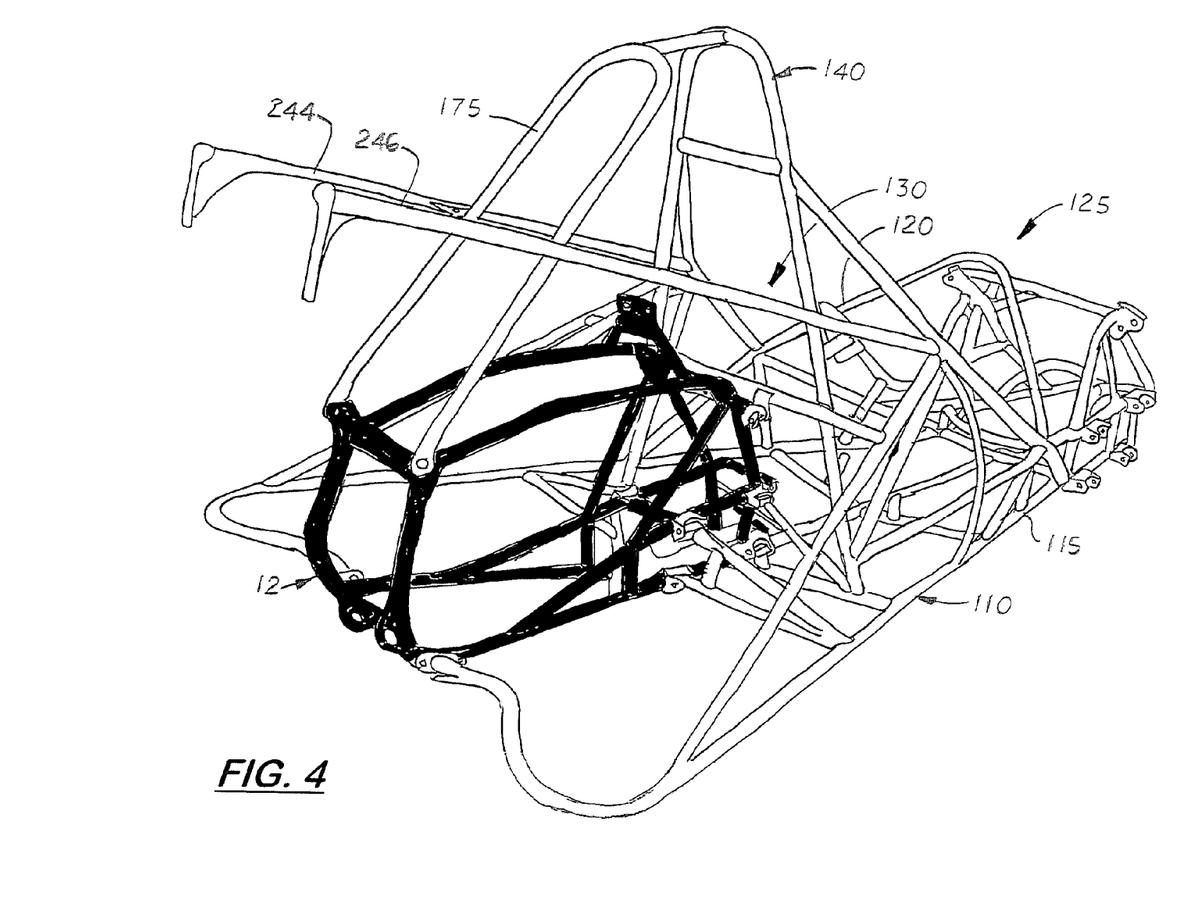
FIG. 4 is a rear perspective view of the hybrid vehicle frame made from an existing ATV's frame shown in black and connected to a sub-frame assembly.
Figure 5:
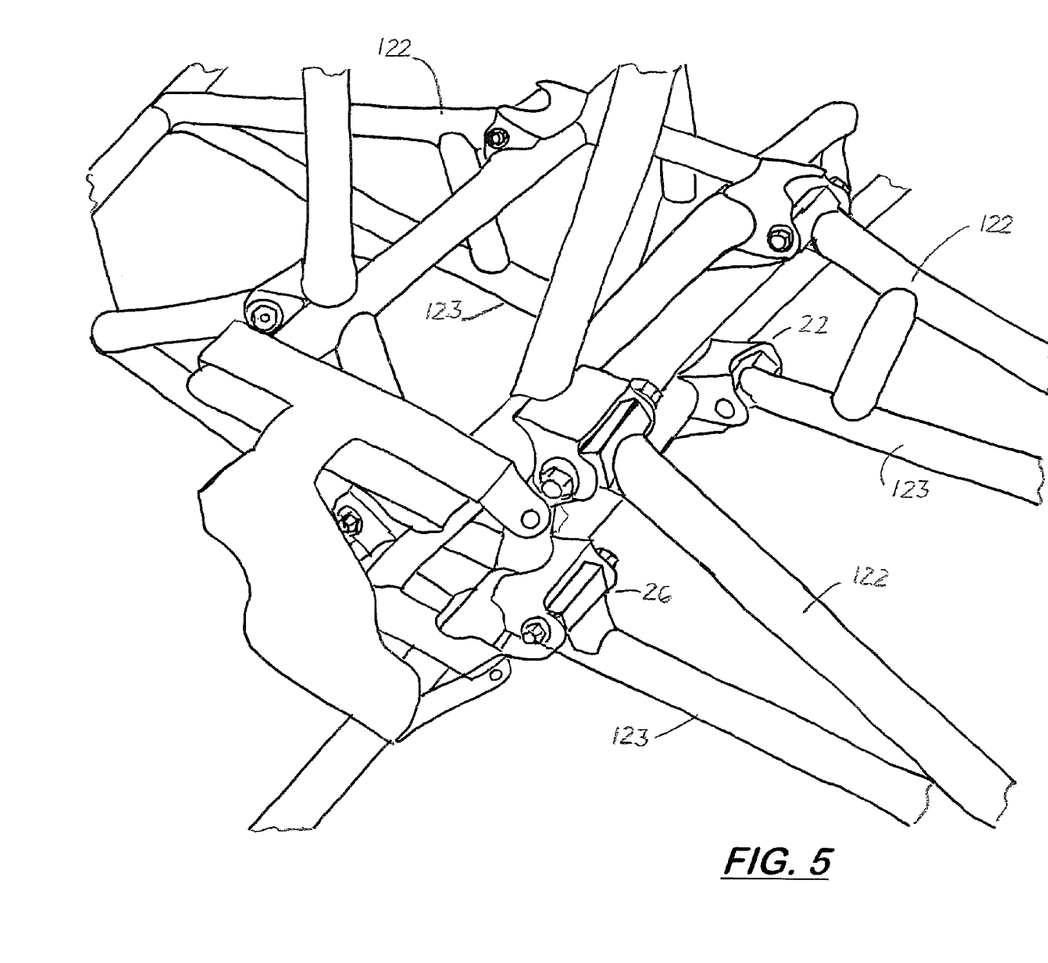
FIG. 5 is a top perspective, rear view showing the front end of the ATV's main frame and the upper and lower A-arms mounting brackets being connected to two sets of converging rear frame members that extend inward from the side frame members.
Figure 6:
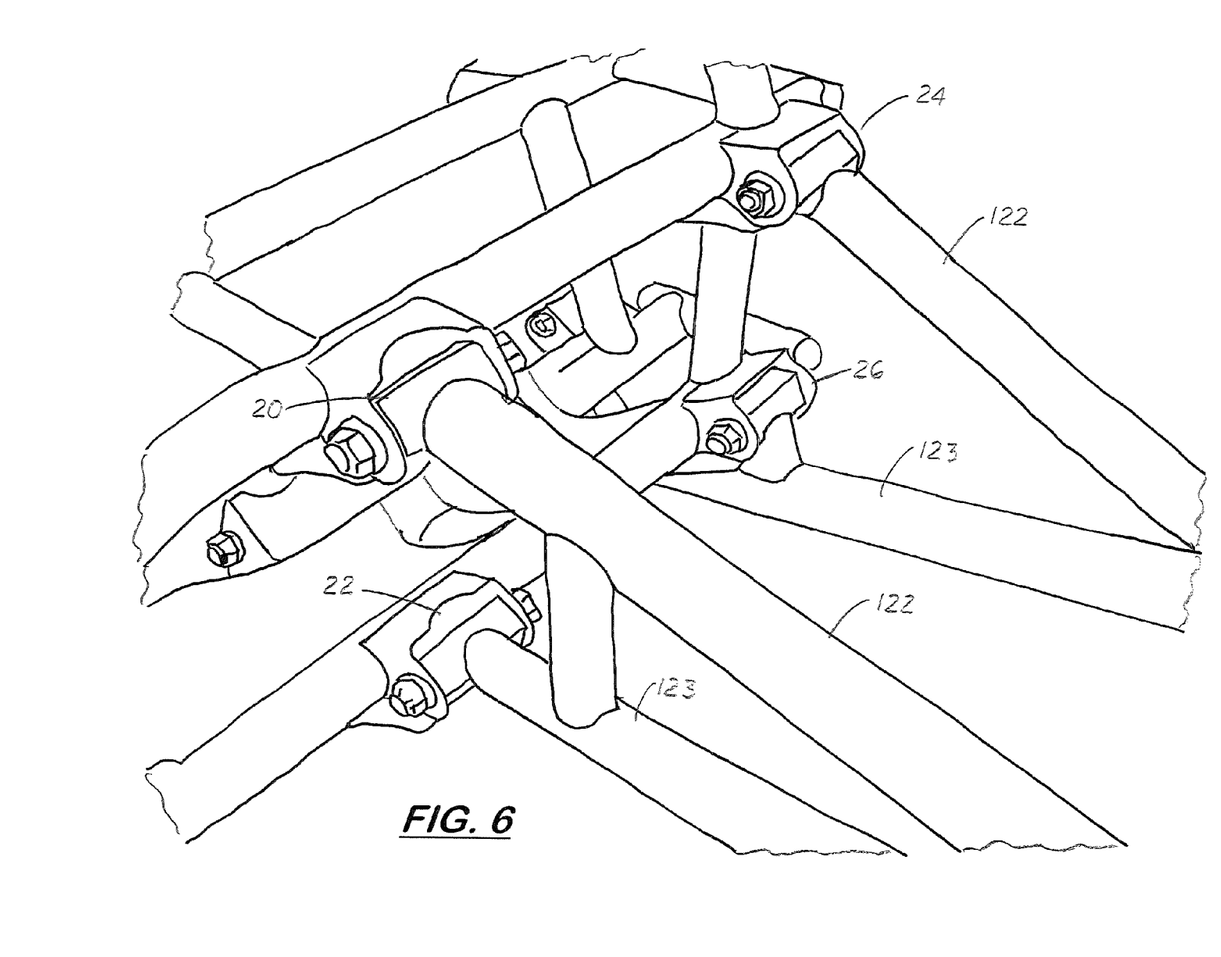
FIG. 6 is a top perspective, forward view showing two sets of converging rear frame members that extend inward from the side frame members being connected to the upper and lower A-arm mounting brackets on the ATV's main frame.
Figure 7:
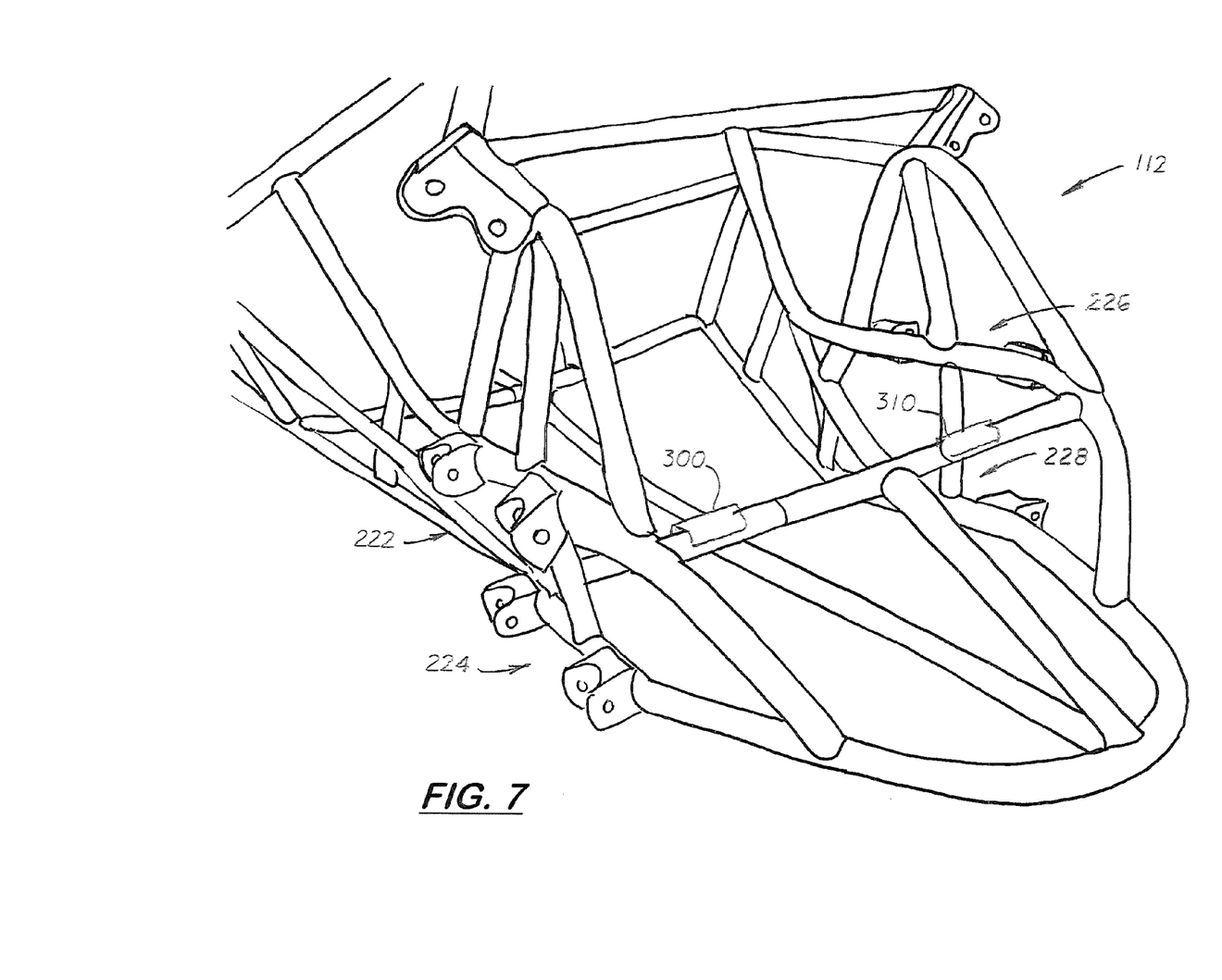
FIG. 7 is a top perspective rear view of the front section of the sub-frame assembly showing the cage assembly and the front suspension mounts on opposite sides of the sub-frame assembly.

Referring to the accompanying FIG. 1, there is shown a hybrid vehicle 100 made from a kit 102 described herein that includes a sub-frame assembly 110 made of lightweight tubular material designed to connect to existing mounting points on the main body 12 of an existing ATV 10 shown in FIG. 2. During assembly, the front suspension 14, front wheels 16, and the front fork assembly 18 are disconnected from the ATV's main body 12. The sub-frame assembly 110 from the kit 102 is then longitudinally aligned and connected to the main body 12 to form an elongated, low profile hybrid vehicle frame 125 with a protective cage 130 and a roll bar 140, (see FIG. 4). The ATV's rear wheels, engine, transmission remain attached to the main body 12. When assembled, the hybrid vehicle 100 uses substantially all of the parts used with the ATV 10 which, when desired, can then be easily disconnected from the kit components found in the kit 102 to reassemble the ATV 10.

More specifically, the sub-frame assembly 110 includes a front section 112 and a rear section 114, and two side frames 115, 120. The sub-frame assembly 110 also includes four pairs of cross members 122, 123 that extend inward from the side frames 115, 120. The four pairs of cross members 122, 123, attached to eight pre-existing A-arm mounting brackets 20-28 attached to the main frame. The sub-frame assembly 110 includes a driver cage 116 in which a seat assembly 160 is placed with a back rest 164 and seat rest 166. The back rest 164 is supported by a diagonally aligned, back rest support frame 162. The seat rest 168 is supported by frame floor members 165 that extend longitudinally under the driver cage 116. The driver cage 116 also includes an upper surrounding frame 170 that extends along the upper edges of the two opposite side frames 115, 120 and then sweeps upward and converges over the sub-frame assembly's center axis to form a partially enclosed driver cavity 116. Extending upward behind the driver cage 116 is a roll bar 140. The roll bar 140 is attached to a rear hoop 175 that extends rearward and connects to the rear section of the ATV's main body 12, (see FIG. 1).

The front section 112 of the sub-frame assembly 110 includes four pairs of A-arm mounting brackets 224-228 identical to the mounting brackets used on the main frame of the ATV 10. During assembly, the A-arms 76 from the ATV 10 are attached to the A-arm mounting brackets 224, 228. Mounted on each A-arm 76 is a wheel hub 52 and tire. The sub-frame assembly 110 includes two longitudinally and diagonally rear wing support members 244, 246 that connect to a rear wing 250 that produces a downward force on the ATV' rear wheels when driven at high speeds.

Figure 11:
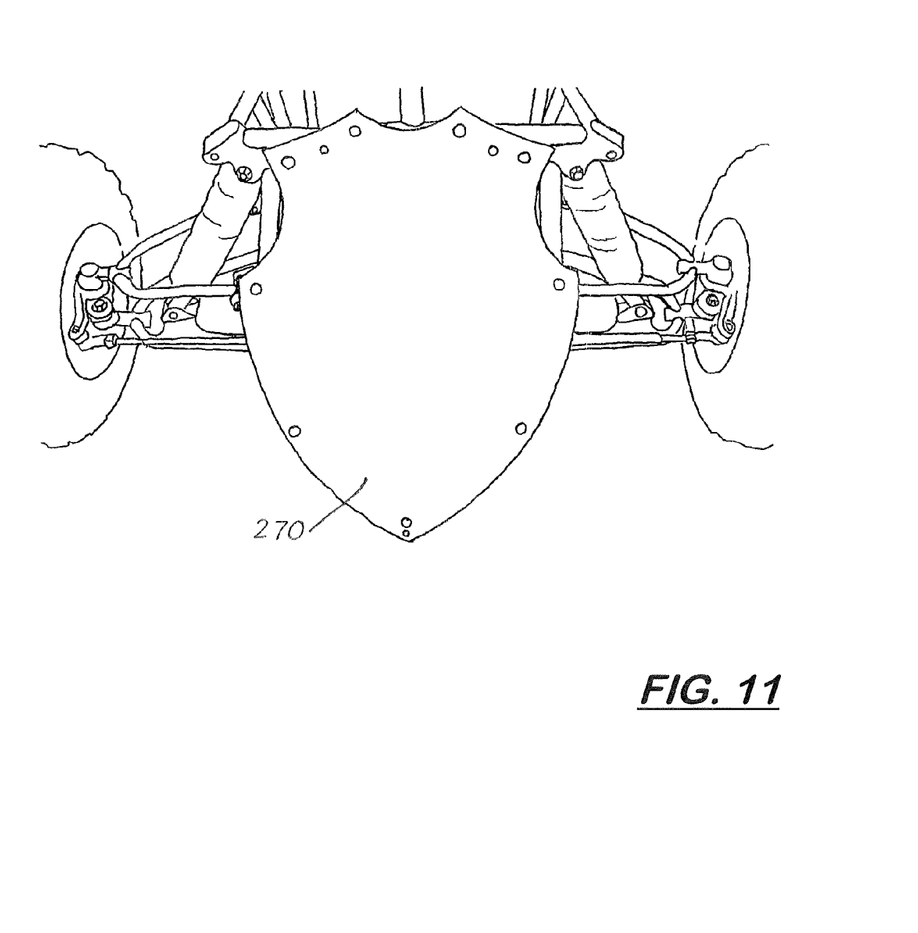
FIG. 11 is a front elevational view of the hybrid vehicle showing the aerodynamic front shield on the front end of the sub-frame assembly that protects the driver's feet when driving.

The sub-frame assembly 110 is made of lightweight tubing with openings formed on the front, sides, top and bottom that allow air to flow freely into the engine 70 for increased cooling. Attached to the front section 112 are adjustable shock suspensions 260 and an aerodynamic front shield 270 as shown in FIG. 11 that protects the driver's feet when driving.

Figure 8:
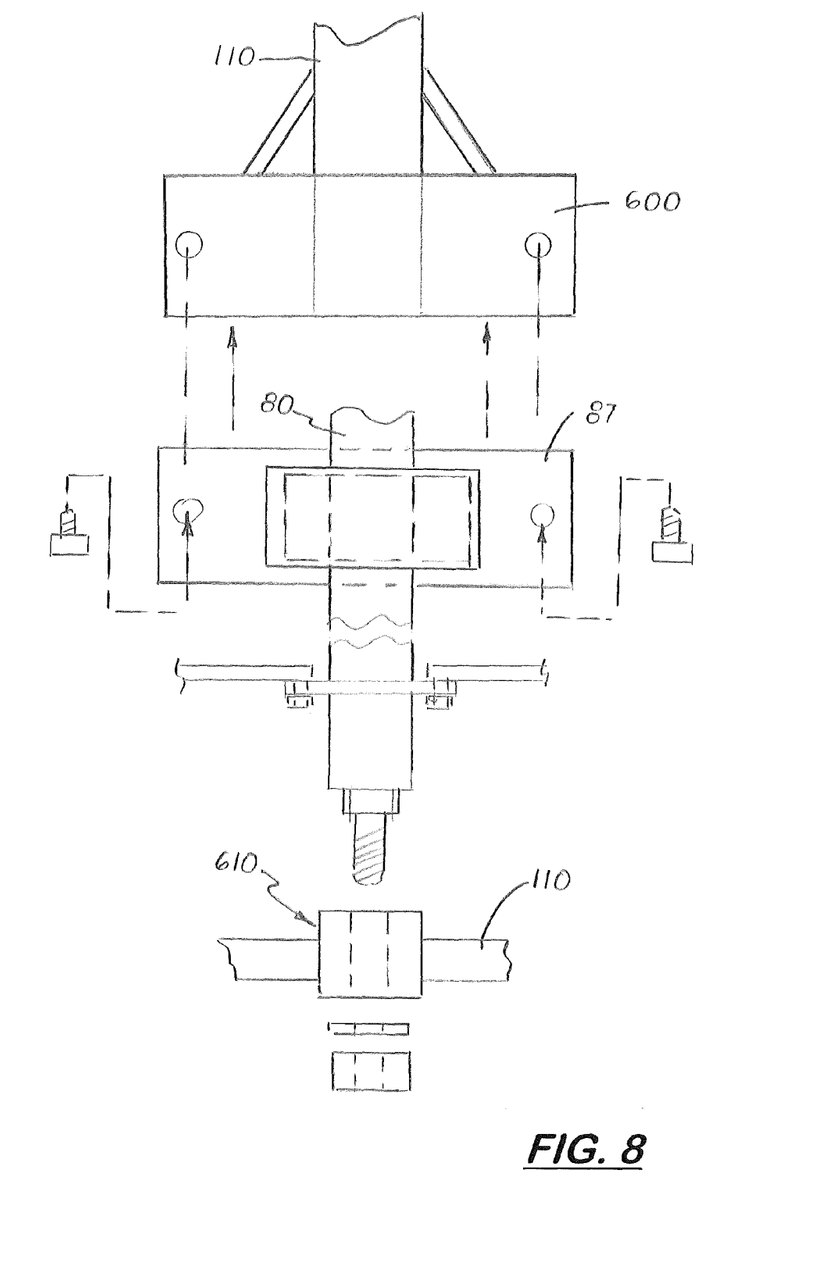
FIG. 8 is an illustration showing a steering mount plate located inside the driver cage and attached to the sub-frame assembly, showing the steering column attached to a carrier bearing plate attached to the steering mount, and showing the lower end of the steering column attached to a lower steering column mount on the sub-frame assembly.

The sub-frame assembly 110 is used with the ATV's steering column 80. As shown in FIG. 8, a steering mount plate 600 located inside the driver cage is attached to an upper member on the sub-frame assembly 110. Disposed over steering mount plate is a carrier bearing plate 87 that receives and surrounds the steering column 80. The lower end of the steering column 80 is inserted into and attached to a lower steering column mount 610 attached to the lower front section of the sub-frame assembly 110. Mounted on the steering column 80 is the ATV handlebar 82 shown in FIG. 9.

Figure 9:
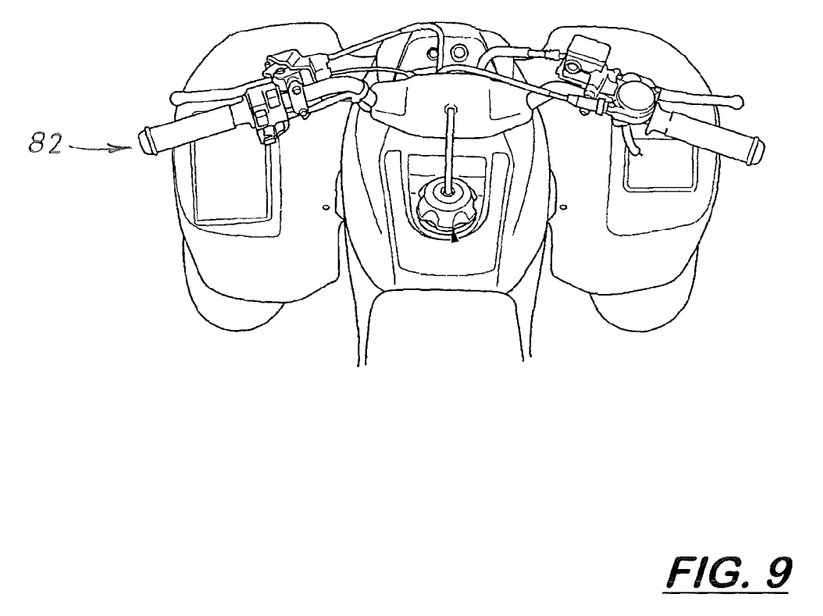
FIG. 9 is an illustration of a handlebar on an ATV showing the parking brake lever, the headlight switch, the engine stop switch, the headlight dimmer switch, the starter button, the throttle control, the neutral indicator switch, the ignition switch, the front brake lever, and the throttle lever.
Figure 10:
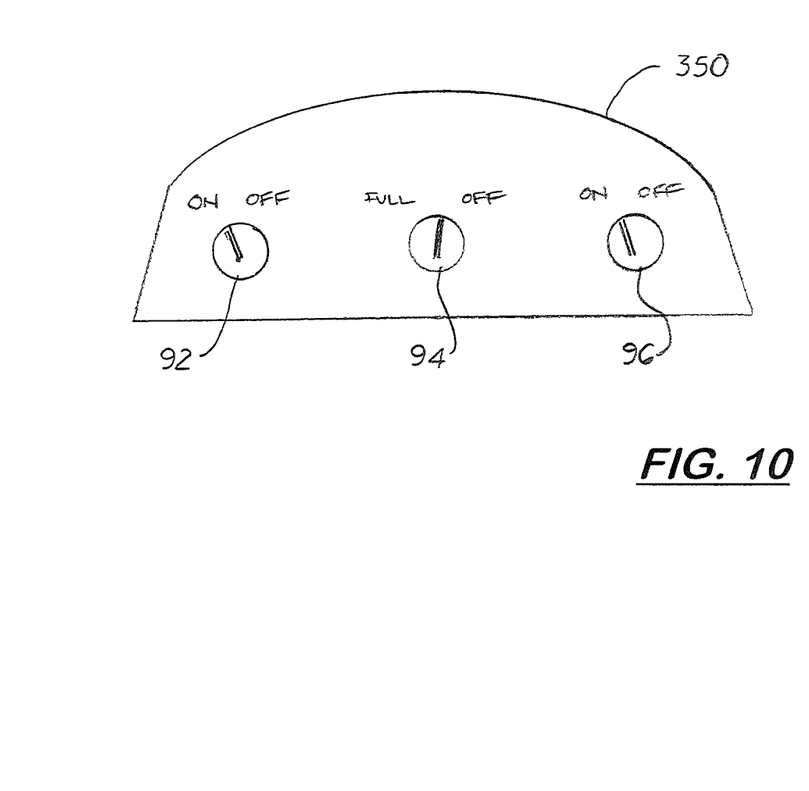
FIG. 10 is an illustration of an optional display panel with control switches mounted thereon.

FIG. 9 is an illustration of a standard ATV handlebar 82 with a parking brake lever, the headlight switch, the engine stop switch, the headlight dimmer switch, the starter button, the throttle control, the neutral indicator switch, the ignition switch, the front brake lever, and the throttle lever. In the preferred embodiment, the ATV's handlebar 82 is mounted on the end of the steering column 80 so the starter ignition switch, the kill ignition switch, a hand throttle lever, and the front hand brake are at the same locations and configurations as they are on an ATV 10. Mounted centrally on the handlebar 82 or on the upper area on the sub-frame assembly in front of the driver cage is an optional display panel 350 on which a headlight switch 92, a headlight dimmer switch 94, a neutral indicator switch 96 used with an ATV are mounted, (see FIG. 10).

Mounted on the floor of the front section 112 is a foot gear shift pedal mount 300 and a rear brake pedal mount 310 that connect to a gear shift pedal and a rear brake pedal (not shown).

FIG. 11 is a front elevational view of the hybrid vehicle 100 showing the aerodynamic front shield 270 on the front end of the sub-frame assembly that protects the driver's feet when driving.

Figure 12:
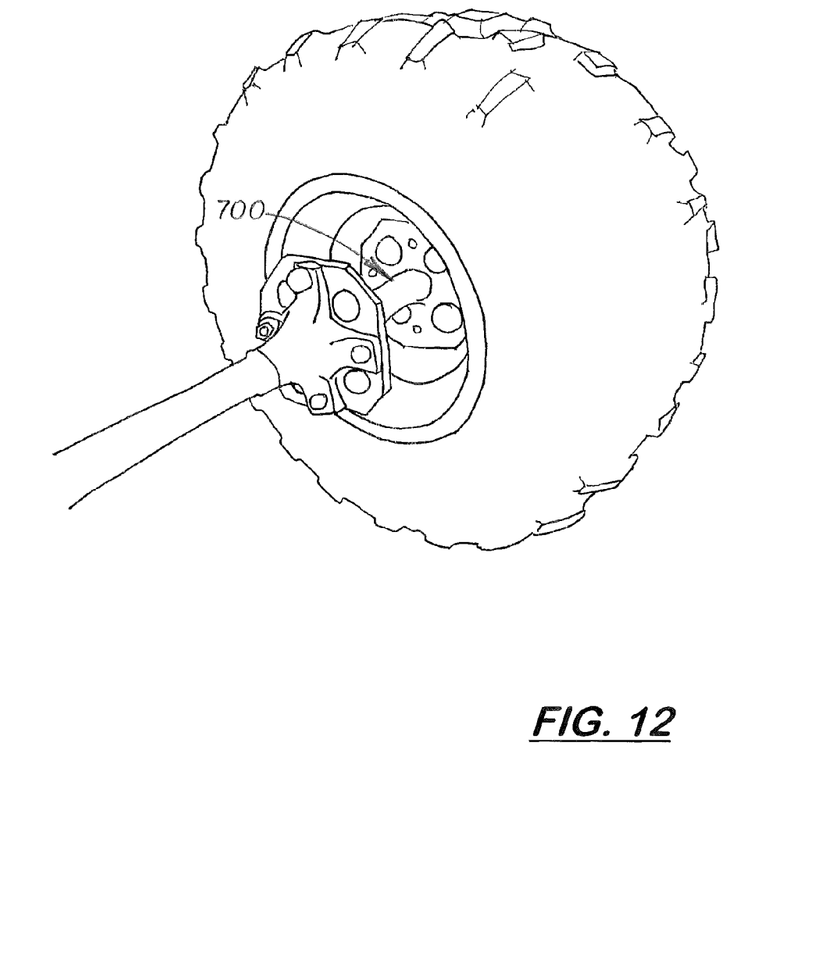
FIG. 12 is a front perspective view showing an optional wheel hub extending adapters that enable wider tread tires with recessed wheels to be attached to the rear and front axles.

FIG. 12 is a front perspective view showing an optional wheel hub extending adapters that enable wider tread tires with recessed wheels to be attached to the rear and front axles.

Figure 3:
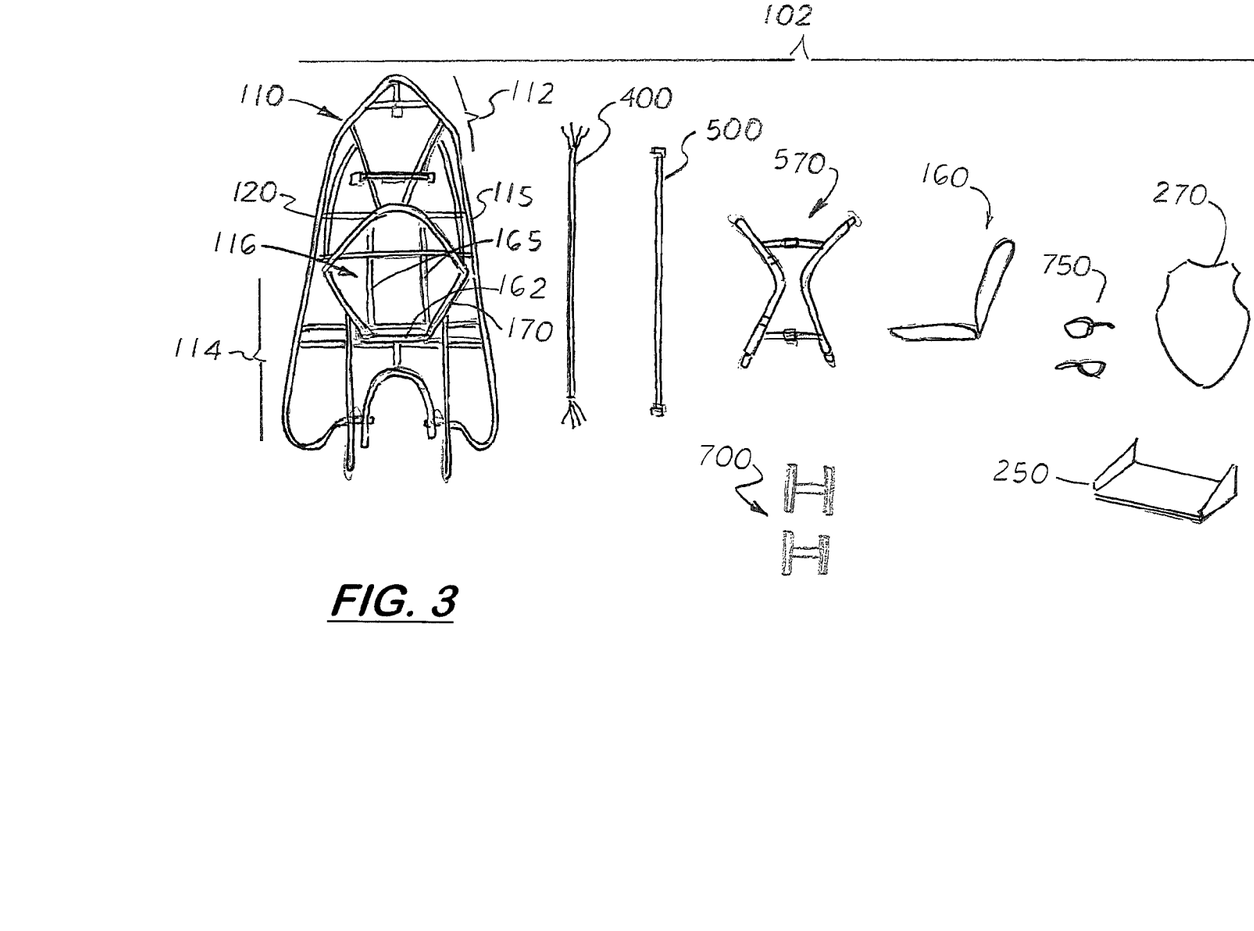
FIG. 3 is a top plan view of the kit that includes a sub-frame assembly, a cable set, a wire harness set, and optional seat, mirrors, shield and rear wing.

As shown in FIG. 3, the kit 102 also includes an optional seat 160, a rear wing 250, a front foot shield 270, a multiple cable extension set 400, an electrical wire harness set 500, a seat belt assembly 570, two rear wheel adapters 700, and one or two rearview mirrors 750. The multiple cable extension set 400 includes cables 401-404 that connect the throttle, front brake hand controls, the clutch pedal and rear brake pedal to the corresponding ATV' components. The wire harness set 500 includes a plurality of wires 501-504 each with plug connectors that enable the wires to connect the ATV's electrical wires the control the starter, the kill switch, and lights.

To assemble a hybrid vehicle 110, a desired ATV 10 (see FIG. 2) and the kit 102 are selected. The the installer removes the ATV plastic body parts, the seat, foot pegs, and the bumper from the ATV 10. The installer then removes the entire front steering column, steering bearing, throttle and brake and electrical controls, and the front suspension components from the ATV 10 The installer then attaches the sub-frame assembly's cross members to the A-arm mounting brackets on the ATV's main frame. The ATV's A-arms are then attached to the A-arm mounting brackets on the sub-frame assembly. The installer then installs the seat, the seat belt assembly, the steering column, the handlebars, the control cables and electrical wires, and all other optional equipment. The hybrid vehicle 100 is then ready for use.

To re-convert the hybrid vehicle 100 into an ATV 10, the above steps are followed in the reverse order.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. An ATV conversion kit, comprising:
    a. an elongated sub-frame assembly including a rear section and a front section, a driver cage, and a roll bar, the sub-frame assembly also includes means for attaching the sub-frame assembly to A-arm brackets on a main frame of an ATV longitudinally aligned and located behind the sub-frame assembly and two front A-arm mounting brackets configured to connect to A-arms removed from the ATV;
    b. a pair of foot pedals located inside the cage;
    c. a cable extension set containing extension control cables that extend from a handlebar hand controls located inside the cage and the foot pedals to the ATV main frame when attached to the sub-frame assembly; and,
    d. an electrical wire harness set containing extension electrical wires that extend from electrical components on an ATV handlebar when located inside the cage to the ATV main frame.

2. The kit as recited in claim 1, wherein said means for attaching the sub-frame assembly to A-arm brackets on the main frame of the ATV longitudinally aligned and located behind the sub-frame assembly are two pairs of cross members.

3. The kit as recited in claim 1, further including a seat assembly located inside the cage.

4. The kit as recited in claim 1, further including at least one rear view mirror attached to the sub-frame assembly and configured for viewing rearward when sitting inside the cage.

5. The kit as recited in claim 1, further including wheel extension adaptors.

6. The kit as recited in claim 1, further including a foot shield.

7. The kit as recited in claim 1, further including a rear wing.

8. A kit for converting an ATV with an engine and transmission and rear axles with two wheels attached to a main frame, two removable front A-arms that attach to front A-arm mounting brackets on opposite sides of the main frame, and a removable front fork assembly with a handlebar with at least one hand control, the kit includes:
    a. an elongated sub-frame assembly that includes a rear section and a front section, the rear section being configured to be attached to the front A-arm mounting brackets on the main frame of the ATV, the front section being configured to connect to the removable two front A-arms used on the ATV, the sub-frame assembly includes a side frame member and forms a driver cage;
    b. a carrier bearing bar mounted on the sub-frame assembly and configured to hold a steering column used on the ATV;
    c. a steering column receiver attached to the front section of the sub-frame assembly;
    d. a pair of foot pedals located inside the cage;
    e. a cable extension set containing extension control cables that extend from handlebar hand controls located inside the cage and the foot pedals to the ATV main frame when attached to the sub-frame assembly; and,
    f. an electrical wire harness set containing extension electrical wires that extend from electrical components on ATV handlebar when located inside the cage to the ATV main frame.

9. The kit as recited in claim 8, wherein means for attaching the sub-frame assembly to the A-arms brackets on the main frame of the ATV longitudinally aligned and located behind the sub-frame assembly are two pairs of cross members.

10. The kit as recited in claim 9, further including seat assembly located inside the cage.

11. The kit as recited in claim 9, further including at least one rear view mirror attached to the sub-frame assembly and configured for viewing rearward when sitting inside the cage.

12. The kit as recited in claim 9, further including wheel extension adaptors.

13. The kit as recited in claim 9, further including a foot shield.

14. The kit as recited in claim 9, further including a rear wing.

15. A method for converting a an ATV into a lower profile vehicle, comprising the following steps:
    a. removing the fenders, seat, front A-arms, front suspension fork assembly, steering column, and handle bar from the ATV;
    b. selecting a kit that includes:
        an elongated sub-frame assembly that includes a rear section and a front section, the rear section being configured to be attached to front A-arm mounting brackets on a main frame of the ATV, the rear section being
        configured to connect to two front A-arms used on the ATV, the sub-frame assembly includes a side frame member and forms a driver cage;

a carrier bearing bar mounted on the sub-frame assembly and configured to hold a steering column used on the ATV;

a steering column receiver attached to the front section of the sub-assembly frame;

a pair of foot pedals located inside the cage;

a cable extension set containing extension control cables that extend from handlebar hand controls located inside the cage and the foot pedals to the ATV main frame when attached to the sub-frame assembly;

an electrical wire harness set containing extension electrical wires that extend from electrical components on an ATV handlebar when located inside the cage to the ATV main frame;

c. attaching the ATV main frame to said sub-frame assembly;

d. attaching the ATV front A-arms to the front A-arm mounting brackets on the sub-frame assembly;

e. attaching the steering column to the carrier bearing bar and the steering column receiver;

f. attaching the handlebar to the steering column;

g. attaching a seat belt assembly to the sub-frame assembly;

h. attaching the cables from the cable extension set from the foot pedals and hand controls to the main frame; and, i. attaching the wires from the wire extension set from the switches on the handlebar or display panel to the main frame.

\* \* \* \* \*